United States Patent
Nilson et al.

(10) Patent No.: US 10,165,724 B2
(45) Date of Patent: Jan. 1, 2019

(54) POTATO SEED PLANTING APPARATUS AND METHOD OF PLANTING POTATO SEED USING THE APPARATUS

(71) Applicant: Crary Industries, Inc., West Fargo, ND (US)

(72) Inventors: Michael A. Nilson, West Fargo, ND (US); Karl Abrahamson, Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 15/360,099

(22) Filed: Nov. 23, 2016

(65) Prior Publication Data

US 2018/0098488 A1 Apr. 12, 2018

Related U.S. Application Data

(60) Provisional application No. 62/405,568, filed on Oct. 7, 2016.

(51) Int. Cl.
| | |
|---|---|
| A01C 5/06 | (2006.01) |
| A01C 7/04 | (2006.01) |
| A01C 9/02 | (2006.01) |
| A01C 19/02 | (2006.01) |
| A01C 7/10 | (2006.01) |
| A01C 9/08 | (2006.01) |
| A01C 21/00 | (2006.01) |

(52) U.S. Cl.
CPC ............. *A01C 7/102* (2013.01); *A01C 5/062* (2013.01); *A01C 5/066* (2013.01); *A01C 7/042* (2013.01); *A01C 9/02* (2013.01); *A01C 9/08* (2013.01); *A01C 19/02* (2013.01); *A01C 21/005* (2013.01)

(58) Field of Classification Search
CPC .. A01C 5/062; A01C 5/06; A01C 5/00; A01C 5/066; A01C 7/042; A01C 7/04; A01C 7/00; A01C 9/02; A01C 9/00; A01C 19/02; A01C 19/00; A01C 7/102; A01C 7/10; A01C 7/08; A01C 9/08; A01C 21/005; A01C 21/00
See application file for complete search history.

(56) References Cited

U.S. PATENT DOCUMENTS

| | | | |
|---|---|---|---|
| 4,928,607 A | 5/1990 | Luigi | |
| 6,244,201 B1 * | 6/2001 | Mauch | .................... A01C 9/02 111/172 |

(Continued)

*Primary Examiner* — Christopher J. Novosad
(74) *Attorney, Agent, or Firm* — Wood, Phillips, Katz, Clark & Mortimer

(57) ABSTRACT

A potato seed planting apparatus has: a frame configured to be advanced over a subjacent field into which potato seed is planted; at least one container on the frame for a supply of potato seed; and a plurality of laterally spaced planting units on the frame. Each of the planting units is configured to cause potato seed from the at least one container to be discharged to the subjacent field at controlled time intervals as the potato seed planting apparatus is advanced in a travel path. First and second of the planting units are configured so that the discharge time intervals for potato seeds from the first planting unit are different than the discharge time intervals for potato seeds from the second planting unit with the potato seed planting apparatus advanced at a first speed in the travel path.

20 Claims, 6 Drawing Sheets

(56) References Cited

U.S. PATENT DOCUMENTS

| | | |
|---|---|---|
| 6,520,100 B1 | 2/2003 | Spooner, Sr. et al. |
| 7,395,769 B2 | 7/2008 | Jensen |
| 8,516,969 B2 | 8/2013 | Wendte et al. |
| 8,850,997 B2 | 10/2014 | Silbernagel et al. |
| 8,868,300 B2 | 10/2014 | Kocer et al. |
| 9,282,692 B2 | 3/2016 | Wilhelmi et al. |
| 9,332,689 B2 | 5/2016 | Baurer et al. |
| 2014/0109810 A1* | 4/2014 | Wilhelmi ............... A01C 19/02 111/185 |
| 2015/0059629 A1 | 3/2015 | Kinzenbaw et al. |

* cited by examiner

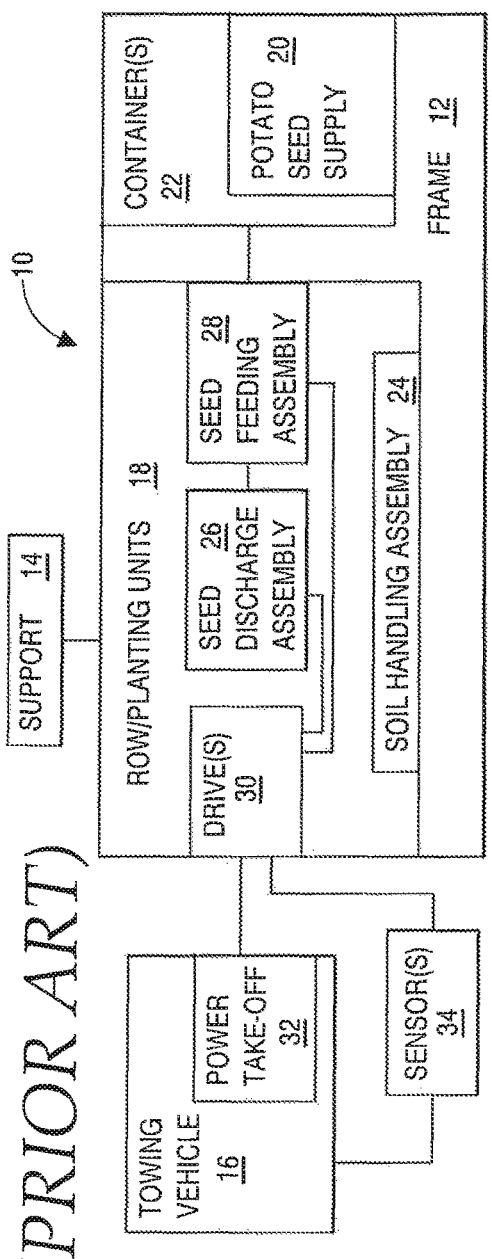
Fig. 1 (PRIOR ART)
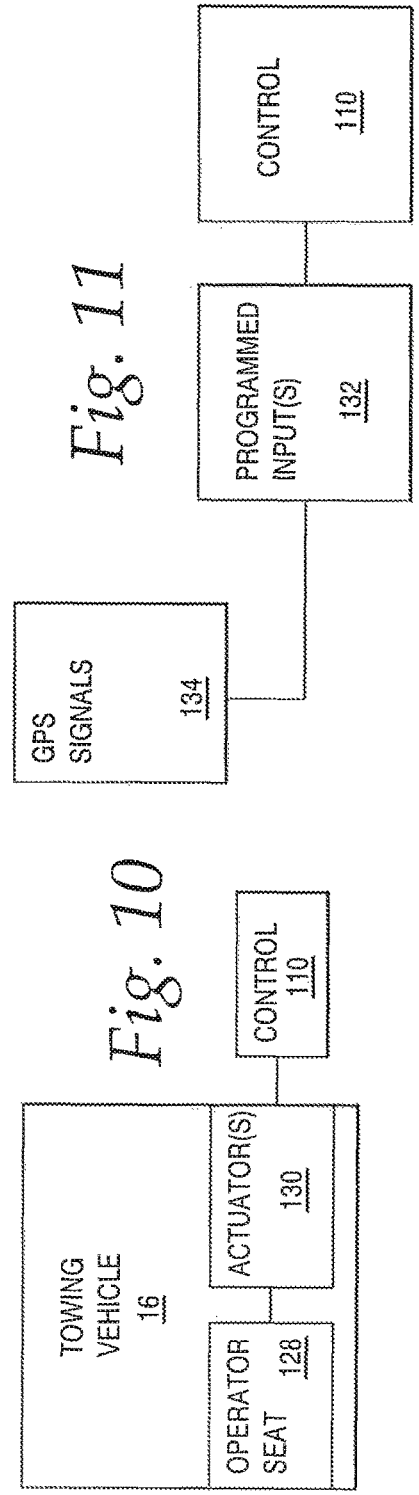
Fig. 11
Fig. 10

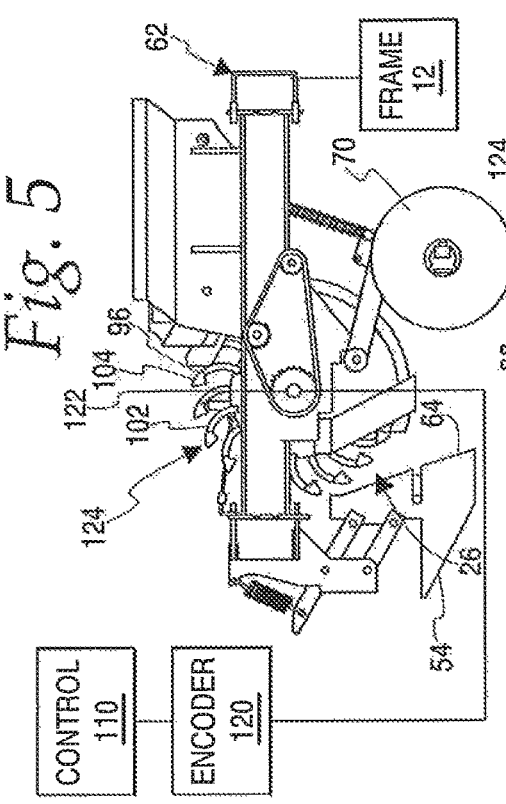
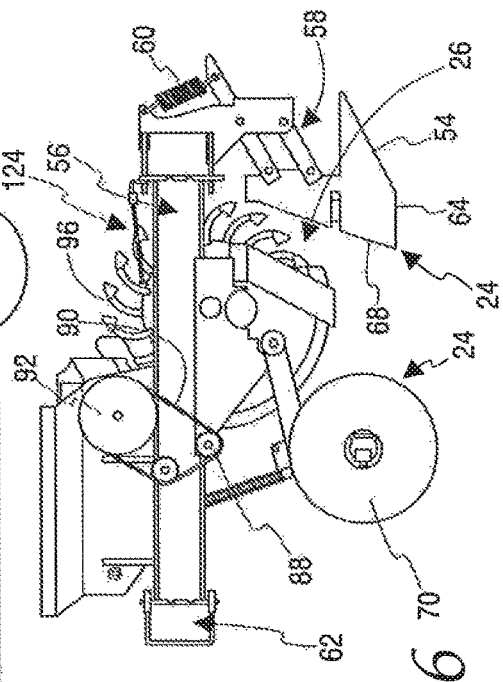
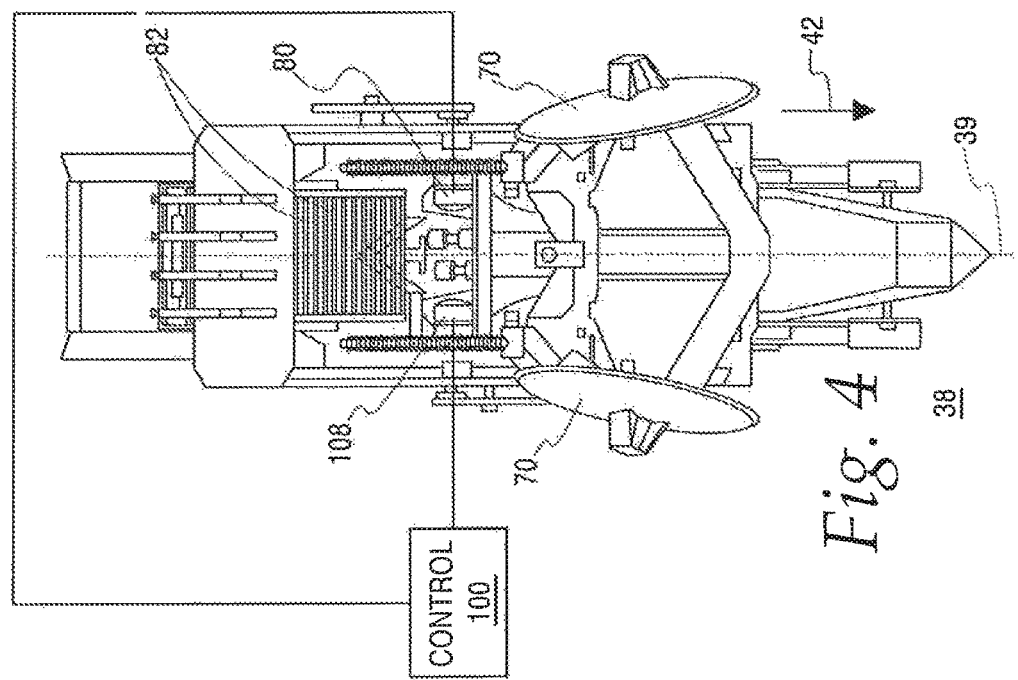

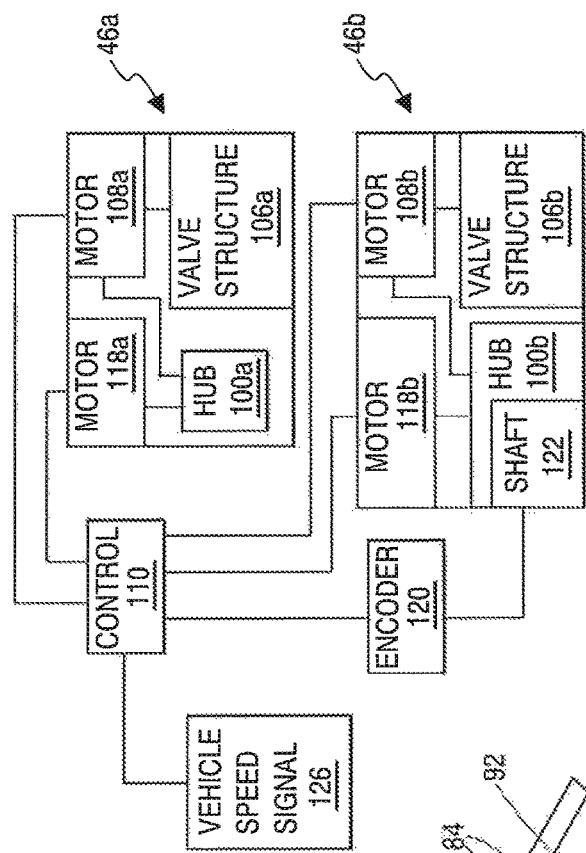
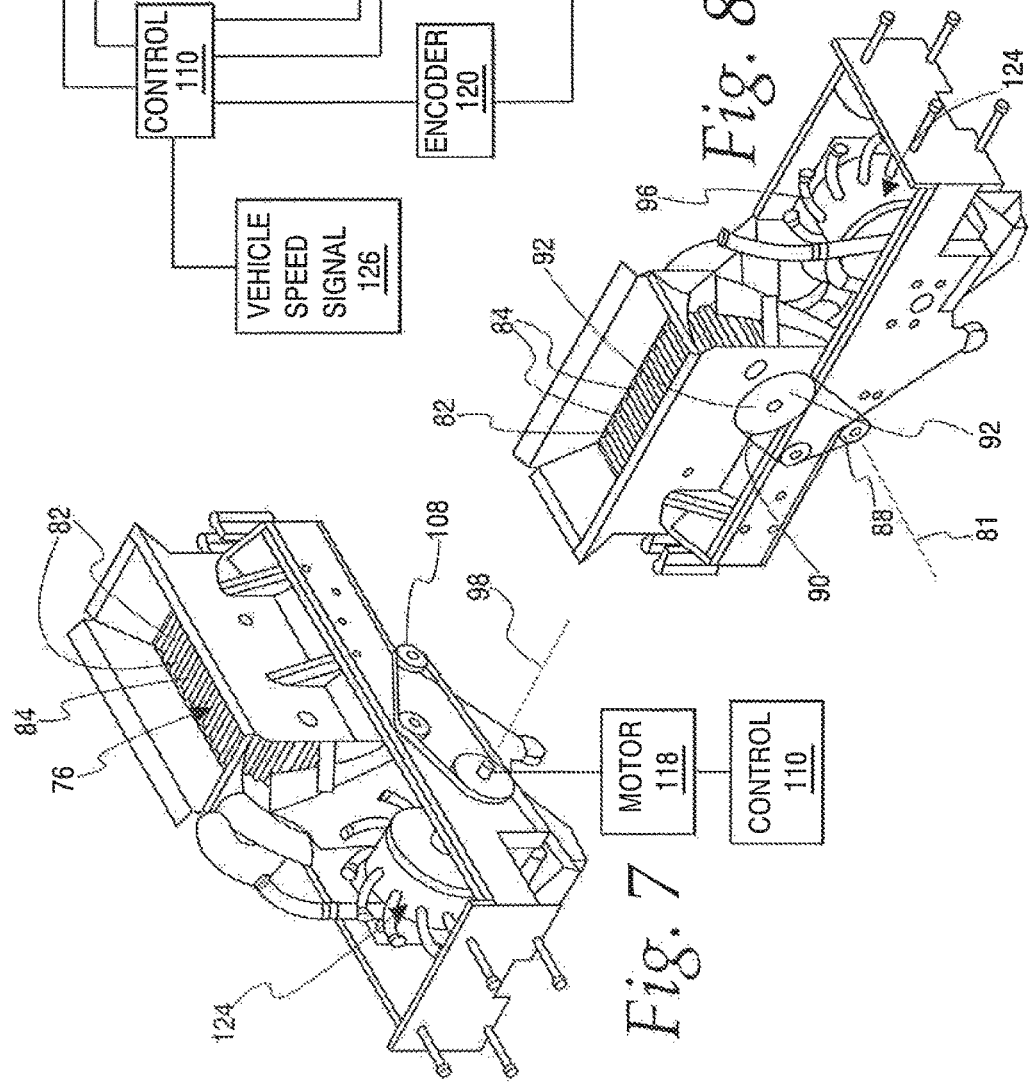
Fig. 9
Fig. 8
Fig. 7

POTATO SEED PLANTING APPARATUS AND METHOD OF PLANTING POTATO SEED USING THE APPARATUS

BACKGROUND OF THE INVENTION

Field of the Invention

This invention relates to potato seed planting apparatus and, more particularly, to an apparatus having multiple row/planting units that simultaneously create furrows in subjacent soil, discharge potato seed from a supply thereof at controlled time intervals into the furrows, and cover the discharged seed continuously as the apparatus is advanced in a travel path. The invention is also directed to a method of using the apparatus.

Background Art

A number of different row/planting unit designs currently exist for planting potato seed continuously as the row/planting units are advanced over a field. The overall construction and operation of potato seed planting apparatus incorporating these row/planting units are basically the same, as shown schematically in FIG. 1.

In FIG. 1, the potato seed planting apparatus 10 consists of a frame 12 carried upon a support 14, that typically has a wheeled construction. The frame 12 is connected to a towing vehicle 16 that is operated to advance the apparatus 10 in a travel path.

The apparatus 10 incorporates a plurality of row/planting units 18, of like construction, supported upon the frame 12 in laterally spaced relationship. Each row/planting unit 18 is designed to plant individual potato seeds, from a supply 20 thereof, into a single furrow/planting row. The seeds from the supply 20 are accumulated in one or more containers 22 from which the seeds are delivered to the row/planting units 18.

Each row/planting unit 18 has a soil handling assembly 24 that creates a furrow for potato seed in the subjacent soil and redistributes the soil to cover the potato seed after it is discharged into the furrow.

A discharge assembly 26 causes individual potato seeds to be serially discharged into the furrows as the apparatus 10 is advanced. The seed discharge assembly 26 is continuously supplied through a seed feeding assembly 28 that controllably delivers potato seed from the container(s) 22 thereto.

The seed discharge assembly 26 and seed feeding assembly 28 are operated by one or more drives 30, operated as by a power take-off 32 on the towing vehicle 16.

In the basic construction, one or more sensors 34 identify the speed of the towing vehicle 16 and generate a representative signal that controls operation of the drive(s) 30 so that the potato seed is discharged at controlled time intervals correlated to the speed of the towing vehicle 16, thereby to cause the potato seed to be planted at regular predetermined distance intervals.

In this basic construction, the row/planting units 18 are interconnected so that they function in the same manner with uniform time interval seed discharge to effect the same distance interval planting of potato seeds in as many rows as there are row/planting units 18 as the row/planting units 18 advance in straight paths. This basic construction has been used to date since it performs adequately in planting over the majority of an area of most field layouts. That is because the apparatus will perform most of the planting over extended straight travel paths such that no changing of the discharge time intervals from one row to the next is critical.

One drawback with uniform operation of row/planting units is that the distance interval between planted potato seeds from one row to the next varies undesirably as turns are navigated. As turning is carried out, the row/planting units move in arcs with different radii as a result of which the potato seeds discharging at constant time intervals are caused to be placed in furrows at different distance intervals.

Another limitation that this conventional construction has is that it does not permit prescription planting based upon variations in potato seed placement, from one row to the next, as dictated by uneven yields determined from one or more prior planting seasons.

The first problem is often dealt with by interrupting operation of the row/planting units when sharp turns or turn-arounds are performed. In certain field configurations, this could lead to a significant loss in yield. The alternative is to continue with the uneven planting which may, again depending upon the configuration of the field, lead to a significant waste of potato seed.

In spite of the above-described problems that have existed for decades in the industry, those planting potato seeds have continued to use existing designs given the unavailability of alternative constructions.

SUMMARY OF THE INVENTION

In one form, the invention is directed to a potato seed planting apparatus having: a frame configured to be advanced over a subjacent field to which potato seed is to be planted; at least one container on the frame for a supply of potato seed; and a plurality of laterally spaced planting units on the frame. Each of the planting units is configured to cause potato seed from the at least one container to be discharged to the subjacent field at controlled time intervals as the potato seed planting apparatus is advanced in a travel path. First and second of the planting units are configured so that the discharge time intervals for potato seeds from the first planting unit are different than the discharge time intervals for potato seeds from the second planting unit with the potato seed planting apparatus advanced at a first speed in the travel path.

In one form, the first and second planting units each has at least one movable component that is configured to engage potato seeds and advance the engaged potato seeds in a predetermined path to cause individual engaged potato seeds to be picked up with the at least one movable component at a first path location and discharged to the subjacent field with the at least one movable component advanced in the predetermined path to a second path location.

In one form, the first planting unit has a first drive for advancing the at least one movable component on the first planting unit. The second planting unit has a second drive for advancing the at least one movable component on the second planting unit. The potato seed planting apparatus further includes a control system that is configured to operate the drives to selectively advance the at least one movable component on the first and second planting units at different speeds.

In one form, the first and second drives each is one of an electric and an hydraulic motor.

In one form, the control system and first and second drives are configured so that through the control system the first and second drives can be selectively changed between: a) a first state wherein the at least one movable component on the first and second planting units are driven at the same speed; b) a second state wherein the at least one movable component on the first and second planting units are driven at different speeds; c) a third state wherein the at least one movable component on the first and second planting units are not driven; and d) a fourth state wherein the at least one movable component on only one of the first and second planting units is driven.

In one form, the potato seed planting apparatus is provided in combination with a towing unit that is connected to the frame and operable to advance the frame over a subjacent field. The towing unit has an operator seat for a user of the potato seed planting apparatus. The control system has at least one actuator that is accessible to a user in the operator seat and operable to control operation of the first and second drives.

In one form, the control unit is configured to receive a programmed input through which at least one of: a) the drive units are changed between different states in a manner customized to a particular planting field; and b) with the first and second drives in the second state a relative speed of the at least one movable component on the first and second planting units is changed in a manner customized to a particular planting field.

In one form, each of the planting units is configured to discharge potato seeds to a single planting row.

In one form, the potato seed planting apparatus is provided in combination with a supply of potato seeds in the container.

In one form, each of the planting units is configured to create a continuous furrow for receiving potato seeds as the potato seed planting apparatus is advanced in the travel path.

In one form, each of the planting units is configured to continuously close a furrow after potato seeds are received in the furrow as the potato seed planting apparatus is advanced in the travel path.

In one form, the first and second planting units and frame are configured so that the first and second planting units are movable together vertically in a guided manner relative to the frame.

In one form, the at least one movable component on at least one of the planting units is moved around an axis to advance potato seed in the predetermined path.

In one form, the at least one movable component on at least one of the planting units is moved in an endless path to advance potato seed in the predetermined path.

In one form, at least one of the planting units is configured to generate a negative pressure to hold the potato seed on its respective, advancing, at least one movable component.

In one form, the control system is configured to automatically set an advancing speed of the at least one movable component on at least one of the planting units based upon a speed of the potato seed planting apparatus in the travel path.

In one form, the potato seed planting apparatus further includes at least one feeding assembly configured to deliver potato seed from the at least one container to at least one location at which potato seed is picked up by the at least one movable component on the first and second planting units.

In one form, the invention is directed to a method of planting potato seed. The method includes the steps of: obtaining the potato seed planting apparatus described above; placing a supply of potato seeds in the container; advancing the potato seed planting apparatus in the travel path; and with the potato seed planting apparatus advancing in the travel path, operating the planting units to continuously plant the potato seed in the subjacent field.

In one form, the potato seed planting apparatus further includes a control system configured to control operation of the drives. The method of planting potato seeds further includes the step of manually operating the drives through the control unit.

In one form, the potato seed planting apparatus further includes a control system configured to control operation of the drives. The method of planting potato seeds further includes the step of obtaining a programmed input to the control unit that automatically controls operation of the drives based upon predetermined conditions of a particular field.

BRIEF DESCRIPTION OF THE DRAWINGS

FIG. 1 is a schematic representation of an exemplary prior art system into which the present invention can be incorporated;

FIG. 4 is a bottom view of one of the row/planting units on the potato seed planting apparatus in FIGS. 2 and 3;

FIG. 5 is an elevation view of the row/planting unit in FIG. 4 from one side thereof;

FIG. 6 is a view as in FIG. 5 from the opposite side;

FIG. 7 is a perspective view of a portion of the row/planting unit in FIGS. 4-6;

FIG. 8 is a view as in FIG. 7 from a different perspective;

FIG. 9 is a schematic representation of two representative row/planting units and a control for components thereof;

FIG. 10 is a schematic representation of a towing vehicle and the control in FIG. 9;

FIG. 11 is a schematic representation of the control in FIG. 9 and potential inputs thereto;

DETAILED DESCRIPTION OF THE PREFERRED EMBODIMENT

Figure 2:
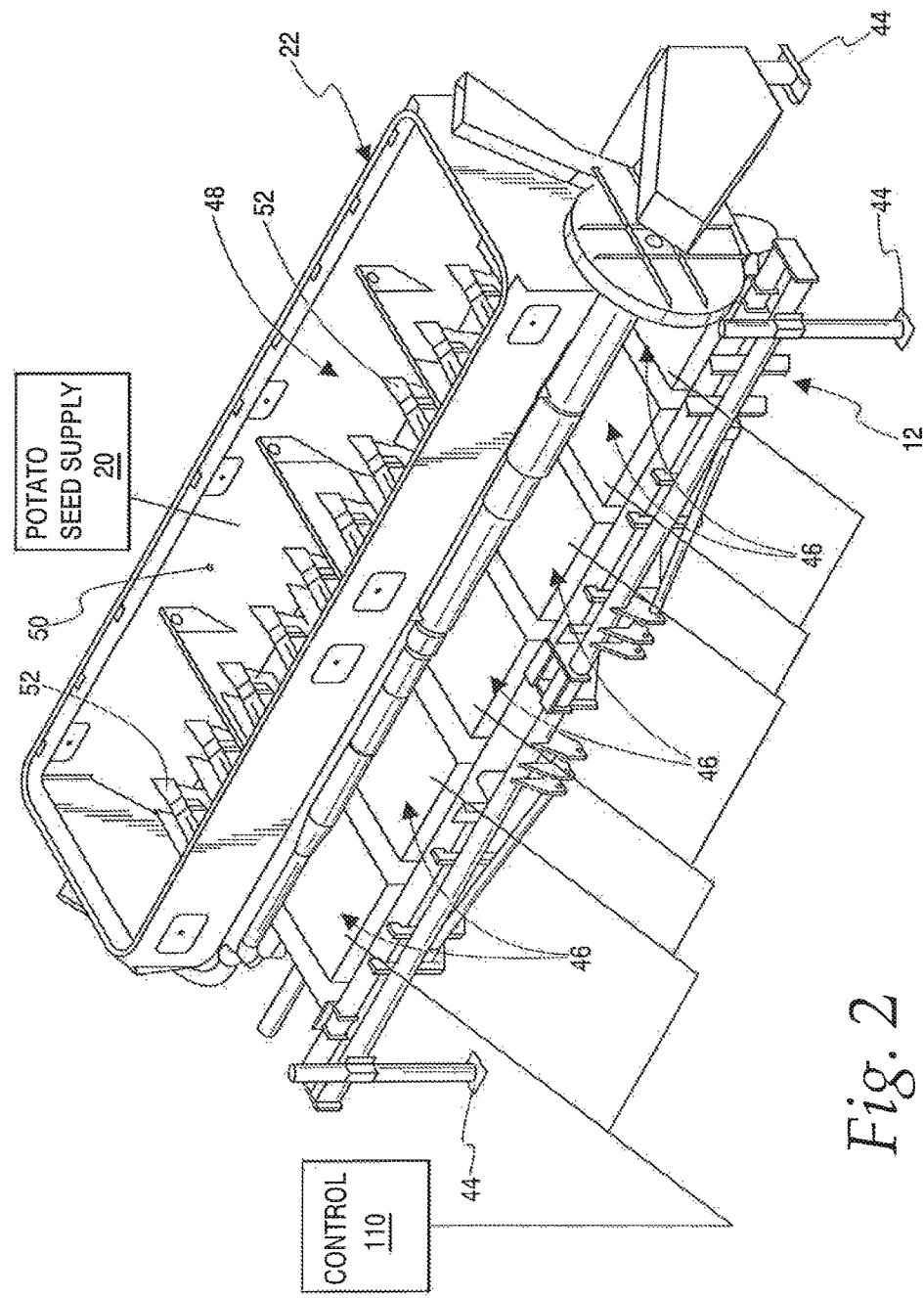
FIG. 2 is a perspective view of a part of a potato seed planting apparatus, according to the present invention, including six laterally spaced row/planting units, each shown in schematic form.

The invention will be described initially as incorporated into one specific form of seed planting apparatus 10, of the type shown schematically in FIG. 1. The invention can be incorporated into virtually an unlimited number of different apparatus designs within the generic showing of FIG. 1. Exemplary details of the apparatus 10 described below should not be viewed as limiting.

The exemplary inventive seed planting apparatus 10, in FIGS. 2-11, has a frame 12 on a support 14. The support 14 has a plurality of wheels 36 that support the frame 12 on the subjacent field surface 38 between adjacent planting rows 39.

The frame 12 has a forwardly projecting bar 40 that is hitched to the towing vehicle 16 that is operated to advance the seed planting apparatus 10 in a forward travel path, as indicated by the arrow 42.

As seen in FIG. 2, wherein part of the frame 12 is shown independently of the support 14 and staged on supporting feet 44, the frame 12 is configured to support six laterally spaced row/planting units 46. The row/planting units 46

(hereinafter, "planting units") are shown in schematic form in FIG. 2 and in detail in FIGS. 3-8.

A container 22 extends substantially the full width of the frame 12 and defines a receptacle 48 for a supply 20 of individual potato seeds 50. The receptacle 48 converges downwardly so that the potato seeds 50 feed by gravitational force towards the planting units 46. A series of laterally spaced dividers 52 cause a widthwise displacement of the potato seed 50 for even distribution to the planting units 46.

Before the details of the planting units 46, and the remainder of the inventive seed planting apparatus 10, are described, the basic structure and operation of the seed planting units 46 will be described. It should be understood that while the planting units 46 are shown to be the same, they might have different constructions on a single planting apparatus.

Each planting unit 46 has a shoe 54 at a leading end. The shoe 54 is supported on a subframe 56 through a linkage at 58 and is biased, as through one or more springs 60, downwardly relative to the subframe 56 against the field surface 38. The subframe 56 is fixed to the remainder of the frame 12 through appropriate mounting structure at 62. This biasing arrangement allows the shoe 54 to deflect upwardly relative to the frame 12 to avoid damage as upon impacting an obstruction in the field.

A boot 64 moves as one piece with the shoe 54 in a following relationship. As the shoe 54 is advanced in the travel path, the shoe 54 creates a furrow 66, with the boot 64 defining a funneling surface 68 to guide individual, downwardly traveling potato seeds 50 into the furrow 66.

A pair of spring-loaded, laterally spaced closing disks 70 follow the boot 64 and are angularly situated to accumulate soil at the sides of a furrow 66 so that the soil covers the potato seeds 50 deposited in the furrow 66 and forms a hill, generally peaked at the center of each row 39.

The shoe 54, boot 64, and closing disks 70 collectively make up the aforementioned soil handling assembly 24 (FIG. 1).

Typically, the individual potato seeds 50 are sized to approximately three ounces. Depending upon the size and type of potato, the individual potato seeds 50 might be uncut or cut to fall within the optimum size range for handling and growth.

The seed feeding assembly at 28 is provided to intercept downwardly traveling potato seeds 50 at the bottom region of the container 22. The feeding assembly 28 consists of an endless belt 76 that is trained around parallel rollers 78a, 78b, 78c, 78d, with the roller 78d being rotated by a drive 80 around a laterally extending axis 81. The drive 80 will typically be an hydraulic motor or an electric motor. In this embodiment, the endless belt 76 is defined by a plurality of parallel rods 82, with lengths extending laterally, joined to produce the endless shape, as through a connecting web 84. The arrangement of the rods 82 causes potato seed 50 placed against the belt 76 to be gripped and advanced forwardly in the direction of the arrow 86 as the belt 76 is driven.

Figure 3:
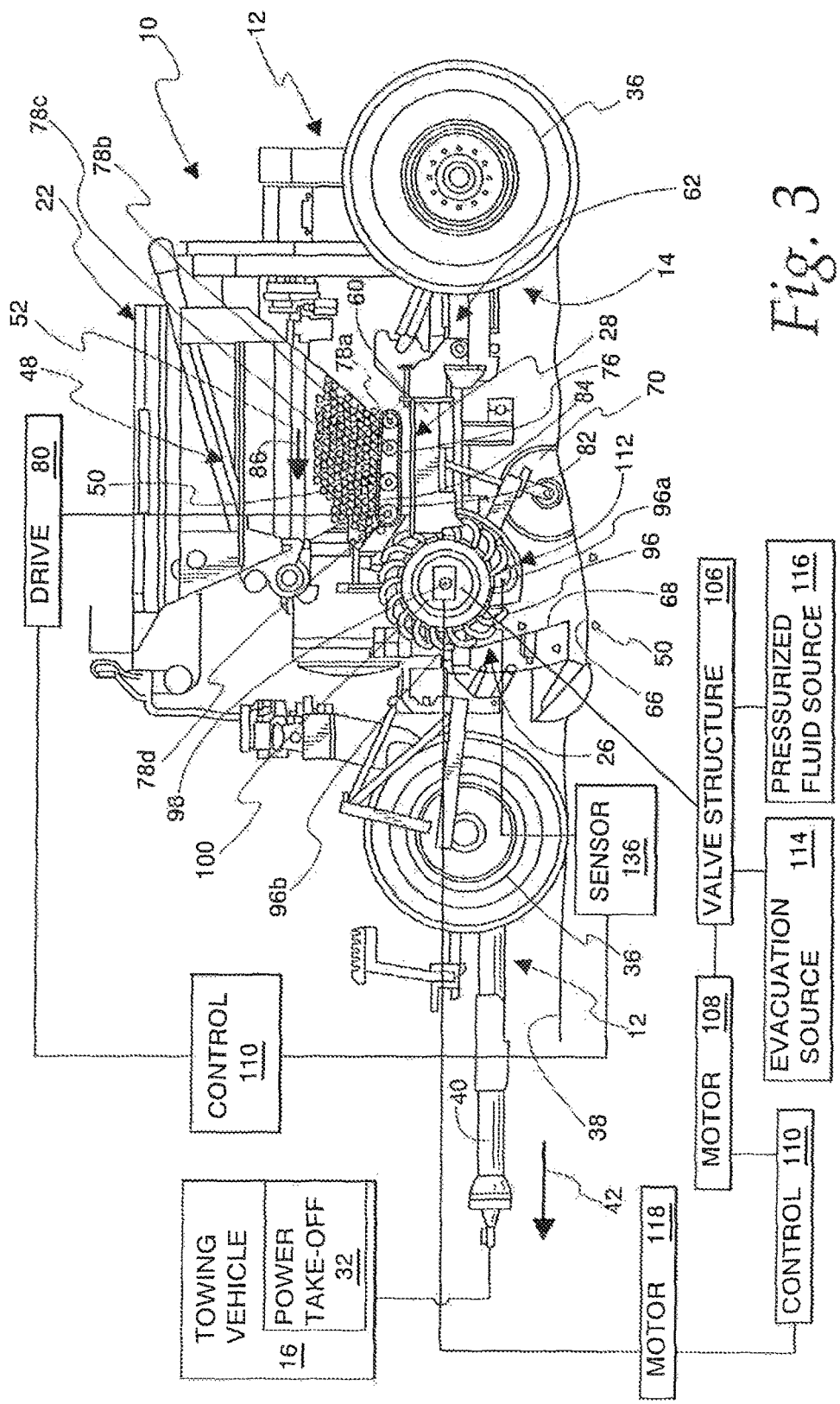
FIG. 3 is a partial cross-sectional, partial schematic, view of the potato seed planting apparatus in FIG. 2 and with a wheeled support incorporated.

In the form depicted, the drive 80, shown schematically in FIG. 3, is an hydraulic motor, or alternatively an electric motor, that turns a sprocket 88 that drives an endless chain 90 engaged with a sprocket 92 that turns with the roller 78d.

The seed discharge assembly at 26 that causes potato seed 50 advanced from the container 22 through the feeding assembly 28 to be discharged in controlled intervals into the furrows 66. The discharge assembly 26 consists of a plurality of components 96 that are movable around a laterally extending axis 98. Each of the components 96 projects generally radially from a hub 100 that turns around the axis 98 relative to the subframe 56. Each of the components 96 is designed to pick up a single potato seed 50 and discharge the same into a furrow 66 for each rotation of the hub 100.

Each component 96 has a tube/conduit 102 with a generally "J" shape, terminating at a cup 104. The cup 104 may have a flexible shape made from a material such as urethane, configured to allow nesting of an individual potato seed 50.

A valve structure 106 is integrated into the hub 100 and is operated through a drive/motor 108. Operation of the motor 108 is coordinated by a central control system/control 110 (hereinafter "control 110"). The motor 108 may be an hydraulic motor or an electric motor.

To facilitate operation of the discharge assembly 26, a collection location at 112 is provided to accept a discrete quantity of the potato seeds 50 delivered by the endless belt 76.

At the initiation of a single turn of the hub 100, the component 96 identified at the location of the component 96a in FIG. 3 is advanced through the accumulation of potato seed 50 at the collection location 112. The control 110 causes the valve structure 106 to place the tube/conduit 102 on the component 96a to be in communication with an evacuation source 114, that creates a negative pressure/vacuum at the cup 104. The J-shaped tube/conduit 102 on the component 96a is configured so that it tends to scoop up a potato seed 50 in the accumulated potato seeds at the collection location 112. The vacuum maintains the scooped potato seed 50 nested in the cup 104.

The vacuum is maintained as the hub 100 turns so that the component 96 with the held potato seed 50 reaches the location of the component identified at 96b in FIG. 3. At this point, the control 110 causes the valve structure 106 to place the tube/conduit 102 in communication with a pressurized fluid source 116 which generates a discharge force that assists gravitational forces, thereby causing the potato seed 50 held by the cup 104 to separate and drop/discharge into the furrow 66. The components 96 function in the same manner and are spaced at regular intervals around the axis 98. With the planting unit 18 advanced at a uniform travel speed and the hub 100 turning at a constant rotational speed, potato seed 50 is planted at regular time and distance intervals.

The hub 100 is driven by the motor 108 or another drive/motor 118 with operation thereof coordinated through the control 110. The motor 118 may be an hydraulic motor or an electric motor. The operation will be described below with the motor 118 driving the hub 100.

An encoder 120 (FIG. 9) is provided to sense a rotational speed of a shaft 122 that rotates with the hub 100 and components 96, together making up a seed wheel 124 that rotates as a unit.

As shown in FIG. 9, exemplary planter units 46a, 46b are independently operable in different manners through the control 110. For example, in each planting unit 46a, 46b, the motors 108a, 118a and 108b, 118b can all be independently operable through the control 110. Through the control 110, the motors 118a, 118b may be placed in a first state wherein they cause their respective seed wheels 124 and associated components 96 to turn at the same speed. This speed may be coordinated with the speed of the towing vehicle 16, determined through a processed speed signal 126 to plant the potato seed 50 at a predetermined and constant time and distance interval for the two rows 39 in which the planting units 46 discharge potato seed 50. The operation of the motors 108a, 108b is coordinated with operation of the motors 118a, 118b through the control 110 as appropriate.

A second state can be selected wherein the seed wheels 124 on the planting units 46a, 46b are driven at different speeds by their respective motors 118a, 118b.

In a potential third state selectable through the control 110, neither of the seeds wheels 124 is driven as the towing vehicle 16 is advanced.

In a potential fourth state, the seed wheel 124 on one of the planting units 46a, 46b is driven, while the other seed wheel 124 is not.

While two exemplary planting units 46a, 46b are described in FIG. 9, any number of independently operable planting units 46 might be utilized.

As shown in FIG. 10, inputs to the control 110 may be made by an operator from the towing vehicle 16, as with the user thereof in an operator seat 128. One or more actuators 130 are accessible to the operator on/in the towing vehicle 16. Various manual inputs might be made.

As shown in FIG. 11, programmed inputs 132 may be made to the control 110. The inputs 132 may be predetermined based upon an earlier mapping of a particular field. The inputs 132 may be coordinated with GPS signals 134 to perform prescription planting. Information from yield maps, soil testing, and moisture evaluations can be used to individually control operation of the planting units 46.

Combinations of manual and pre-programmed inputs are also contemplated.

As an example of how the operator might use the inventive system, the operator might plant using different seed spacing in different rows at one time. Alternatively, the operator may turn individual, or all, planting units 46 on and off strategically by stopping operation of the seed wheels 124, as at the ends of fields and in other areas. As a further alternative, the operator may vary the planting rate based upon particular field conditions.

By controlling the turning speed of the speed wheels 124, the discharge time intervals for the potato seeds can be changed. The actual discharge distance interval is a product of both the turning speed of the seed wheels 124 and the travel speed of their respective planting unit 46. Component operation can be coordinated through the control 100 to produce the desired planting distance interval, regardless of the travel speed of the towing vehicle 16.

The control 110 may coordinate components so that the turning speed of the seed wheels 124 automatically changes as the rate of speed of the towing vehicle 16 in its travel path changes.

Some additional details of the overall system will now be described.

As shown in FIG. 3, a sensor 136 may be provided to identify a level of accumulated potato seed at the collection location 112. The control 110 processes a signal from the sensor 136 to cause the drive 80 to cause turning of the roller 78d at different speeds or stop, depending upon the detected level of potato seed 50.

As noted above, the system described is exemplary in nature only. The drives/motors 80, 108, 118 might be electrically and/or hydraulically operated. One or more of the drives/motors 80, 108, 118 may be driven by the power take-off 32 on the towing vehicle 16. One skilled in the art could readily devise one or more electric/hydraulic circuits to facilitate coordinated operation, as described above, through the control(s) 110.

The planting units 46 are connected to the frame 12 through the aforementioned mounting structure at 62 that allows the planting units 46 to move independently in a vertically guided manner relative to the frame 12.

Figure 12:
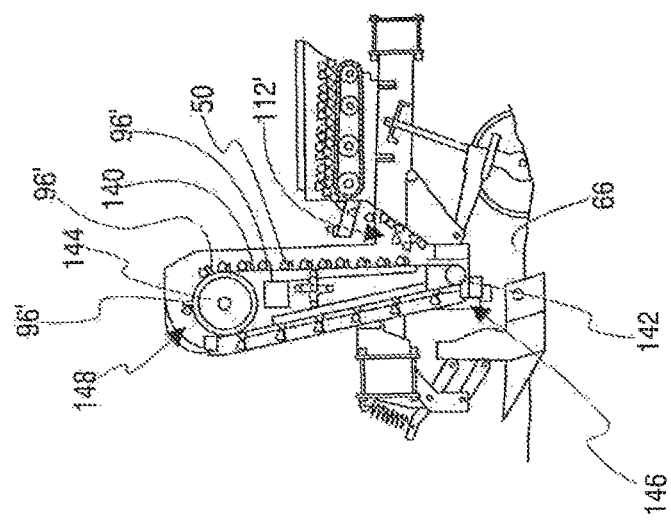
FIG. 12 is a fragmentary, side elevation, view of a conventional row/planting unit into which the invention can be incorporated.

The movable components 96 do not have to have the construction as hereinabove described. Virtually an unlimited number of different movable components that operate in the same general manner are contemplated. As one example, as shown in FIG. 12, as an alternative to the seed wheels 124, an endless member 140, trained around spaced rollers 142, 144, may be utilized to convey the potato seed 50 from a corresponding collection location 112' to a location at 146 whereat they are discharged to an underlying furrow 66. A series of cup-shaped movable components 96' are spaced at uniform intervals along the length of the member 140. As the components 96' move upwardly, they scoop and hold individual potato seeds 50. As the vertically advancing components 96' change direction to downwardly at the location 148, the carried potato seeds 50 release and fall gravitationally to the immediately upstream component 96'. As the components 96' change direction at the location 146, the seeds 50 separate.

Figure 13:
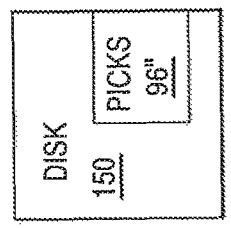
FIG. 13 is a schematic representation of another conventional form of row/planting unit into which the invention can be incorporated.

In an alternative form as shown in FIG. 13, the movable components 96" may be in the form of picks projecting at regular intervals from a disk 150 that turns around an axis. For each rotation of the disk 150, each pick 96" impales a seed 50 so that the seed follows the pick 96" until it falls under its own weight off of the pick 96" at a spaced location and discharges into a furrow.

The same structure and operation, described above for planting potato seed, can be used to apply fertilizer/chemical at various stages during a planting/growing cycle.

While the invention has been described using a separate towing vehicle 16, the frame 12 may have its own propulsion unit to advance the frame 12 in a travel path over a field.

Figure 14:
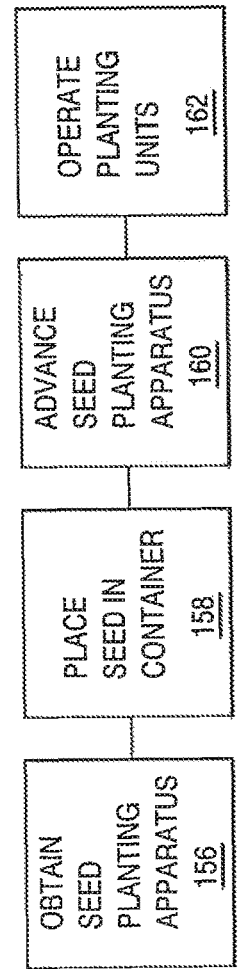
FIG. 14 is a flow diagram representation of a method of planting potato seed, according to the invention.

With the inventive structure, a method of planting potato seed can be carried out as shown in flow diagram form in FIG. 14.

As shown at block 156, a potato seed planting apparatus, as described above, is obtained.

As shown at block 158, a supply of potato seed is placed in a container on the potato seed planting apparatus.

As shown at block 160, the potato seed planting apparatus is advanced in a travel path.

As shown at block 162, with the potato seed planting apparatus advancing in its travel path, the planting units are operated to continuously plant the potato seed in a subjacent field.

The foregoing disclosure of specific embodiments is intended to be illustrative of the broad concepts comprehended by the invention.

The invention claimed is:

1. A potato seed planting apparatus comprising:
    a frame configured to be advanced over a subjacent field to which potato seed is to be planted;
    at least one container on the frame for a supply of potato seed; and
    a plurality of laterally spaced planting units on the frame, each of the planting units configured to cause individual potato seeds from the at least one container to be individually handled and so that only single potato seeds are discharged to the subjacent field at controlled time intervals as the potato seed planting apparatus is advanced in a travel path,
    first and second of the planting units configured so that the discharge time intervals for potato seeds from the first planting unit are different than the discharge time intervals for potato seeds from the second planting unit with the potato seed planting apparatus advanced at a first speed in the travel path.

2. The potato seed planting apparatus according to claim 1 wherein the first and second planting units each has at least one movable component that is configured to engage potato seeds and advance the engaged potato seeds in a predetermined path to cause individual engaged potato seeds to be picked up with the at least one movable component at a first path location and discharged to the subjacent field with the at least one movable component advanced in the predetermined path to a second path location.

3. The potato seed planting apparatus according to claim 2 wherein the first planting unit has a first drive for advancing the at least one movable component on the first planting unit and the second planting unit has a second drive for advancing the at least one movable component on the second planting unit and the potato seed planting apparatus further comprises a control system that is configured to operate the drives to selectively advance the at least one movable component on the first and second planting units at different speeds.

4. The potato seed planting apparatus according to claim 3 wherein the first and second drives each comprises one of an electric and hydraulic motor.

5. The potato seed planting apparatus according to claim 3 wherein the control system and first and second drives are configured so that through the control system the first and second drives can be selectively changed between: a) a first state wherein the at least one movable component on the first and second planting units are driven at the same speed; b) a second state wherein the at least one movable component on the first and second planting units are driven at different speeds; c) a third state wherein the at least one movable component on the first and second planting units are not driven; and d) a fourth state wherein the at least one movable component on only one of the first and second planting units is driven.

6. The potato seed planting apparatus according to claim 5 in combination with a towing unit that is connected to the frame and operable to advance the frame over a subjacent field, the towing unit comprising an operator seat for a user of the potato seed planting apparatus, and the control system comprises at least one actuator that is accessible to a user in the operator seat and operable to control operation of the first and second drives.

7. The potato seed planting apparatus according to claim 5 wherein the control unit is configured to receive a programmed input through which at least one of: a) the drive units are changed between different states in a manner customized to a particular planting field; and b) with the first and second drives in the second state a relative speed of the at least one movable component on the first and second planting units is changed in a manner customized to a particular planting field.

8. The potato seed planting apparatus according to claim 3 wherein the control system is configured to automatically set an advancing speed of the at least one movable component on at least one of the planting units based upon a speed of the potato seed planting apparatus in the travel path.

9. The potato seed planting apparatus according to claim 2 wherein the at least one movable component on at least one of the planting units is moved around an axis to advance potato seed in the predetermined path.

10. The potato seed planting apparatus according to claim 2 wherein the at least one movable component on at least one of the planting units is moved in an endless path to advance potato seed in the predetermined path.

11. The potato seed planting apparatus according to claim 2 wherein at least one of the planting units is configured to:

a) generate a negative pressure to hold the potato seed on a respective advancing at least one movable component; and
b) generate a positive pressure to release and deliver a held potato seed directly to a subjacent field.

12. The potato seed planting apparatus according to claim 2 wherein the potato seed planting apparatus further comprises at least one feeding assembly configured to deliver potato seed from the at least one container to at least one location at which potato seed is picked up by the at least one movable component on the first and second planting units.

13. The potato seed planting apparatus according to claim 1 wherein each of the planting units is configured to discharge potato seeds to a single planting row.

14. The potato seed planting apparatus according to claim 1 in combination with a supply of potato seeds in the container.

15. The potato seed planting apparatus according to claim 1 wherein each of the planting units is configured to create a continuous furrow for receiving potato seeds as the potato seed planting apparatus is advanced in the travel path.

16. The potato seed planting apparatus according to claim 15 wherein each of the planting units is configured to continuously close the furrow after potato seeds are received in the furrow as the potato seed planting apparatus is advanced in the travel path.

17. The potato seed planting apparatus according to claim 1 wherein the first and second planting units and frame are configured so that the first and second planting units are movable together vertically in a guided manner relative to the frame.

18. A method of planting potato seed, the method comprising the steps of:
obtaining the potato seed planting apparatus of claim 1;
placing a supply of potato seeds in the container;
advancing the potato seed planting apparatus in the travel path; and
with the potato seed planting apparatus advancing in the travel path, operating the planting units to continuously plant the potato seed, one-by-one at controlled intervals in the subjacent field.

19. The method of planting potato seed according to claim 18 wherein the first and second planting units each has at least one movable component that is configured to engage potato seeds and advance the engaged potato seeds in a predetermined path to cause individual engaged potato seeds to be picked up with the at least one movable component at a first path location and discharged to the subjacent field with the at least one movable component advanced in the predetermined path to a second path location, wherein the first planting unit has a first drive for advancing the at least one movable component on the first planting unit and the second planting unit has a second drive for advancing the at least one movable component on the second planting unit and the potato seed planting apparatus further comprises a control system that is configured to operate the drives to selectively advance the at least one movable component on the first and second planting units at different speeds, wherein the potato seed planting apparatus further comprises a control system configured to control operation of the drives and further comprising the step of manually operating the drives through the control unit.

20. The method of planting potato seed according to claim 18 wherein the first and second planting units each has at least one movable component that is configured to engage potato seeds and advance the engaged potato seeds in a predetermined path to cause individual engaged potato seeds to be picked up with the at least one movable component at a first path location and discharged to the subjacent field with the at least one movable component advanced in the predetermined path to a second path location, wherein the first planting unit has a first drive for advancing the at least one movable component on the first planting unit and the second planting unit has a second drive for advancing the at least one movable component on the second planting unit and the potato seed planting apparatus further comprises a control system that is configured to operate the drives to selectively advance the at least one movable component on the first and second planting units at different speeds, wherein the potato seed planting apparatus further comprises a control system configured to control operation of the drives and further comprising the step of obtaining a programmed input to the control unit that automatically controls operation of the drives based upon predetermined conditions of a particular field.

* * * * *